(12) United States Patent
Algie et al.

(10) Patent No.: US 7,970,006 B1
(45) Date of Patent: Jun. 28, 2011

(54) DYNAMIC CONFIGURATION FOR A MODULAR INTERCONNECT

(75) Inventors: Glenn Algie, Ottawa (CA); Hasler Hayes, Munster Hamlet (CA)

(73) Assignee: Ciena Corporation, Linthicum, MD (US)

(*) Notice: Subject to any disclaimer, the term of this patent is extended or adjusted under 35 U.S.C. 154(b) by 1225 days.

(21) Appl. No.: 10/797,271

(22) Filed: Mar. 10, 2004

Related U.S. Application Data

(60) Provisional application No. 60/453,141, filed on Mar. 10, 2003.

(51) Int. Cl.
*H04J 3/16* (2006.01)

(52) U.S. Cl. .................................................. 370/465

(58) Field of Classification Search ............... 370/229, 370/230, 231, 235, 252, 464, 466, 254, 395.2, 370/395.21, 395.3, 395.5, 395.51, 463, 465, 370/389, 392, 241, 351; 709/220, 218, 249, 709/223; 712/153; 455/67.11; 713/100; 710/8, 10, 1, 20
See application file for complete search history.

(56) References Cited

U.S. PATENT DOCUMENTS

| | | | | | |
|---|---|---|---|---|---|
| 5,689,714 | A | * | 11/1997 | Moyer ........................... | 713/310 |
| 5,883,894 | A | * | 3/1999 | Patel et al. ..................... | 370/438 |
| 5,884,041 | A | * | 3/1999 | Hurwitz ......................... | 709/228 |
| 5,980,078 | A | * | 11/1999 | Krivoshein et al. .............. | 700/1 |
| 6,385,196 | B1 | * | 5/2002 | Hayball et al. ................. | 370/356 |
| 6,392,891 | B1 | * | 5/2002 | Tzlil et al. ..................... | 361/719 |
| 6,658,565 | B1 | * | 12/2003 | Gupta et al. ................... | 713/153 |
| 6,667,992 | B1 | * | 12/2003 | Yanagawa ..................... | 370/490 |
| 7,000,052 | B2 | * | 2/2006 | Moon et al. .................... | 710/300 |
| 7,043,569 | B1 | * | 5/2006 | Chou et al. ..................... | 710/8 |
| 7,127,521 | B2 | * | 10/2006 | Hsu et al. ...................... | 709/233 |
| 7,355,970 | B2 | * | 4/2008 | Lor ............................... | 370/231 |
| 2001/0032283 | A1 | * | 10/2001 | Chen et al. .................... | 710/200 |
| 2002/0174193 | A1 | * | 11/2002 | Mikhalchuk ................... | 709/219 |
| 2003/0174726 | A1 | * | 9/2003 | Dove ............................. | 370/463 |
| 2004/0162928 | A1 | * | 8/2004 | Benson .......................... | 710/301 |
| 2004/0168008 | A1 | * | 8/2004 | Benson et al. ................. | 710/306 |
| 2004/0189460 | A1 | * | 9/2004 | Heaton et al. ................. | 340/500 |

* cited by examiner

*Primary Examiner* — Kwang B Yao
*Assistant Examiner* — Anh Ngoc Nguyen
(74) *Attorney, Agent, or Firm* — Christopher & Weisberg, P.A.

(57) ABSTRACT

The present invention relates to adaptive interconnect logic, which is adapted to communicate with various types of modules that are plugged into the interconnect logic, and to automatically configure itself to interact with the various modules. For each module interface, the interconnect logic can take on different interface personalities for facilitating communications via the data path. Preferably, the interconnect logic will automatically configure itself to provide the appropriate layer or physical and media access control layers, to effectively communicate with computer premise equipment via the modules. The interface personality will define pin functionality, signal levels, acceptable protocols, and the like. In general, the interconnect logic provides a universal translator between a control system associated with the access equipment and the various modules, which need to be plugged into the access equipment.

12 Claims, 3 Drawing Sheets

DYNAMIC CONFIGURATION FOR A MODULAR INTERCONNECT

This application claims the benefit of U.S. provisional application Ser. No. 60/453,141 filed Mar. 10, 2003, the disclosure of which is incorporated herein by reference in its entirety.

FIELD OF THE INVENTION

The present invention relates to communications, and in particular to a dynamically configurable interconnect used to automatically adapt to two different module interfaces.

BACKGROUND OF THE INVENTION

Interconnecting modules are used to connect computer premise equipment of various types of networks at the network edges. Generally, a centralized network, such as an optical metropolitan area network, an enterprise network, a wireless network, or a wireline network such as the Public Switched Telephone Network, interfaces with various types of access equipment capable of converting between various communication technologies, such that data can be transferred over the central network using a common technology. Interconnecting various communication technologies results in the need for various types of interfaces for the access equipment. Traditionally, such access equipment is capable of accepting various modules, which provide the interface between customer premise equipment and the access equipment. Since the communication technologies differ, the modules differ respectively. As such, interconnecting logic must be specific for each type of communication technology. Traditionally, customization is provided in hardware and requires specialized interconnecting logic and module interfaces, which may be manually configured. Such manual configuration is inefficient and expensive. Further, when modules are changed or upgraded, the interconnecting logic must be changed accordingly. Given this environment, there is a need for interconnecting logic that is capable of automatically configuring itself to be able to effectively interact with various types of modules in a dynamic fashion.

SUMMARY OF THE INVENTION

The present invention relates to adaptive interconnect logic, which is adapted to communicate with various types of modules that are plugged into the interconnect logic, and to automatically configure itself to interact with the various modules. For each module interface, the interconnect logic can take on different interface personalities for facilitating communications via the data path. Preferably, the interconnect logic will automatically configure itself to provide the appropriate layer or physical and media access control layers, to effectively communicate with computer premise equipment via the modules. The interface personality will define pin functionality, signal levels, acceptable protocols, and the like. In general, the interconnect logic provides a translator between a control and datapath system associated with the access equipment and the various modules, which need to be plugged into the access equipment.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
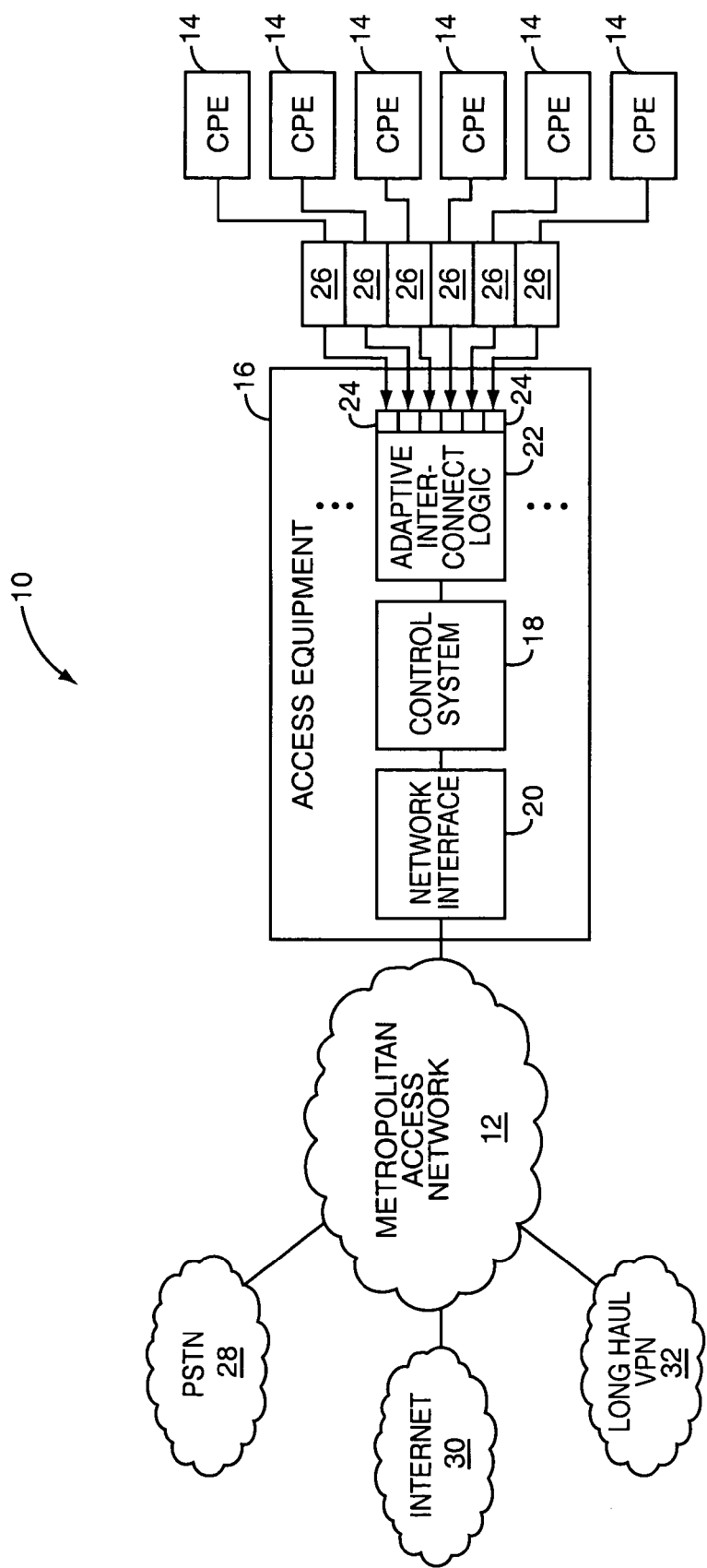
FIG. 1 is a block representation of a communication environment according to the present invention.

With reference to FIG. 1, a communication environment 10 is centered around a centralized access network, such as a metropolitan access network 12, which must be accessed by various computer premise equipment (CPE) 14. The computer premise equipment 14 may use different communication technologies and connect through various access lines to access equipment 16, which interfaces with the metropolitan access network 12.

The access equipment 16 will preferably include a control system 18 associated with a network interface 20 for connecting to the metropolitan access network 12, as well as adaptive interconnect logic 22. The adaptive interconnect logic 22 will include a number of interfaces 24 and receiving modules 26, which terminate the lines connecting to the computer premise equipment 14. Since the customer premise equipment 14 may require different communication technologies, the respective modules 26 will support these technologies, and must be plugged into an interface 24 of the adaptive interconnect logic 22 that is capable of interacting with the module 26.

The adaptive interconnect logic 22 is adapted to configure the interface 24 in an automated fashion so it may properly interact with the module 26. The adaptive interconnect logic 22 will communicate with the module 26 via a control plane, such as by simply communicating using the available and standardized control pins on the interface 24 and the module 26. Once the adaptive interconnect logic 22 and the respective module 26 successfully negotiate an interface configuration, referred to herein as a personality, the interface personality is implemented and communications may begin. The interface personality preferably defines the manner in which layer communications occur.

Once communications begin, the control system 18 will cooperate with the network interface 20 and the adaptive interconnect logic 22 to effectively allow data to be transmitted back and forth between the metropolitan access network 12 and the proper customer premise equipment 14. Generally, the metropolitan access network 12 is a centralized network, which ultimately connects to various other types of networks, such as the Public Switched Telephone Network (PSTN) 28, the Internet 30, or other network, such as a Long Haul Virtual Private Network (VPN) 32.

Figure 2:
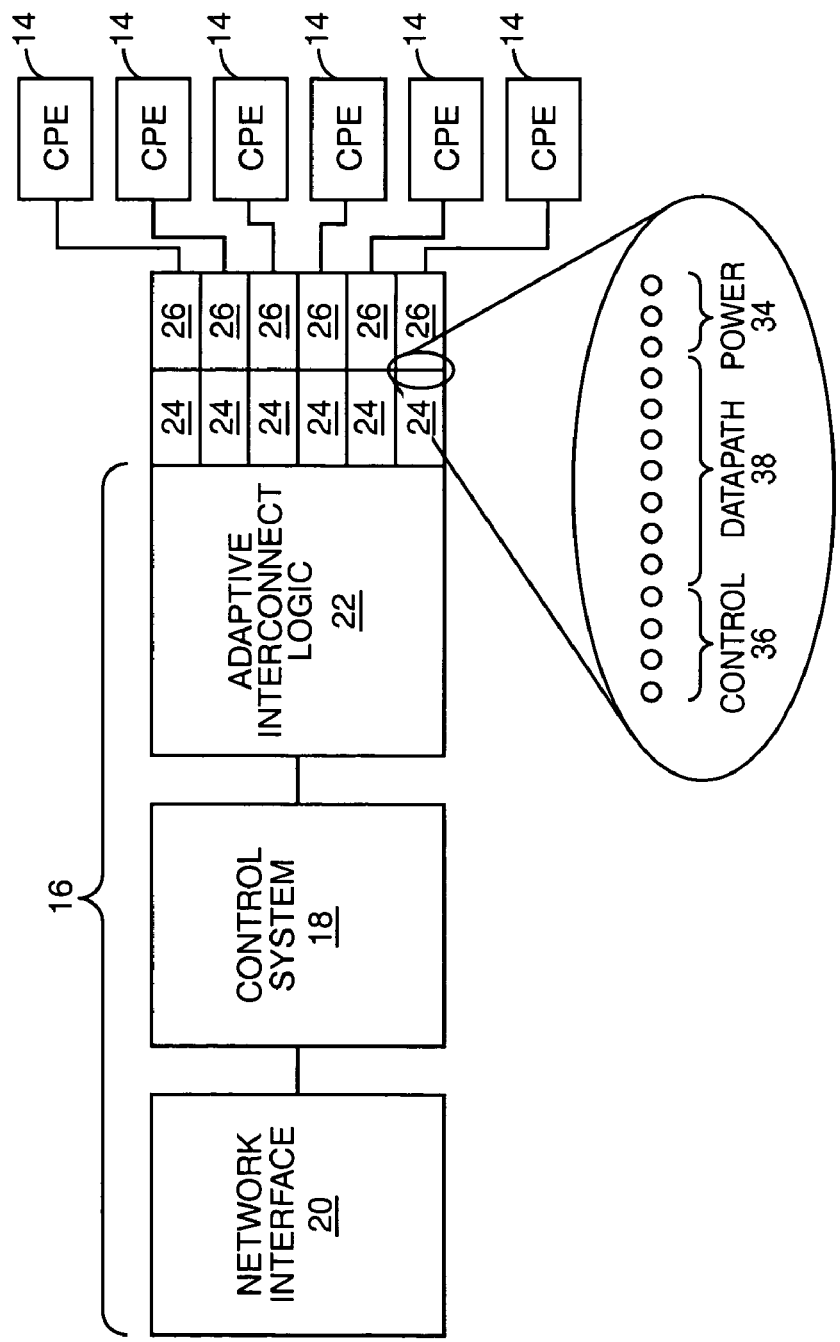
FIG. 2 is a block representation of access equipment configured according to one embodiment of the present invention.

Turning now to FIG. 2, the interconnection between the interface 24 and the module 26 is shown as being associated with a plurality of pins, which are divided into power pins 34, control pins 36, and datapath pins 38. As alluded to above, the control pins 36 and the power pins 34 are preferably standardized such that when the interface 24 and the modules 26 interconnect, that the control pins 36 and power pins 34 are generic to and recognized by each. The primary differences in the interfaces 24 relate to the pin assignments, voltage levels, and signal forms associated with the datapath provided through the datapath pins 38. Accordingly, the present invention provides a personality for the datapath in an automated fashion based on negotiations between the adaptive interconnect logic 22 and the module 26 via the control pins 36 of the interface 24. Preferably, the adaptive interconnect logic 22 is a field programmable gate array (FPGA) or other form of programmable logic capable of storing numerous available personalities, and implementing a personality after the above-mentioned negotiations with the appropriate module 26. Importantly, different interfaces 24 associated with a common adaptive interconnect logic 22 can take on different personalities, and as such, provide an interface to different communication technologies via the modules 26 and provide a standard communication technology, protocol. The interconnect configuration could change based on time of day or traffic loads to provide more capacity in one direction or the other.

Figure 3:
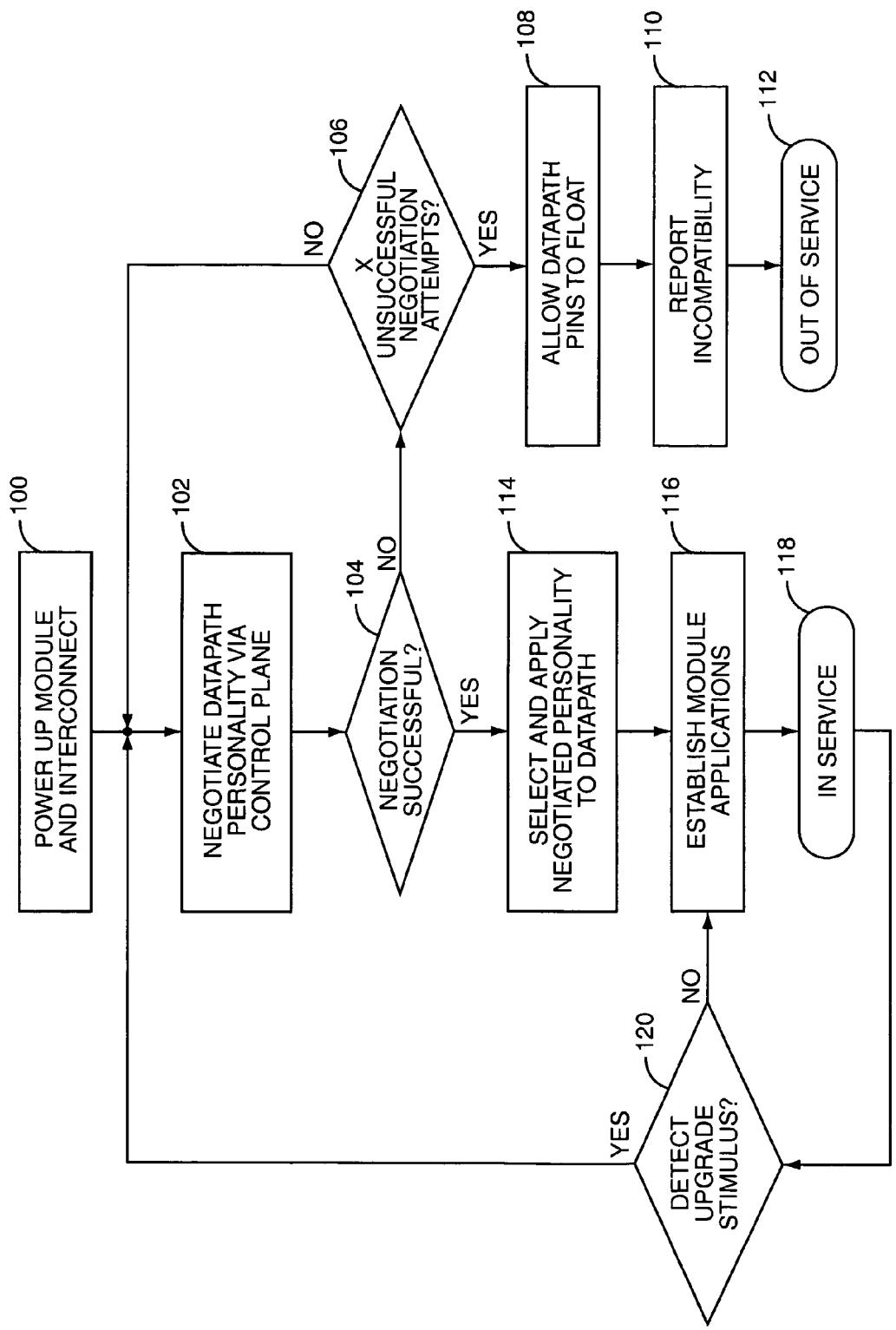
FIG. 3 is a flow diagram outlining the basic operation of one embodiment of the present invention.

Turning now to FIG. 3, operation of the adaptive interconnect logic 22 is illustrated, wherein once a module 26 is plugged into an interface 24, power is applied to the adaptive interconnect logic 22 and the module 26 (step 100), and negotiations begin to determine an appropriate datapath personality via the control plane (step 102). If the negotiations are not successful, indicating that a personality is not available (step 104), the adaptive interconnect logic 22 will attempt to renegotiate for a defined number of times (X). If there has been a defined number of unsuccessful negotiation attempts (step 106), the adaptive interconnect logic 22 will allow the datapath pins 38 to remain floating (step 108), report such incompatibility to the control system 18 (step 110), and effectively take the current interface 24 and module 26 out of service (step 112).

If and when negotiations are successful (step 104), the adaptive interconnect logic 22 will select and apply the negotiated personality to the datapath (step 114) and establish any module applications (step 116), which effectively indicates that the module 26 is running and the adaptive interconnect logic 22 will cooperate with the module 26 to process data received from and sent to the computer premise equipment 14. At this point, the module 26 is in service (step 118), and the adaptive interconnect logic 22 will periodically monitor for upgrades or changes that may affect the negotiated personality. If an upgrade stimulus is detected (step 120), the module 26 has apparently been modified in a manner that affects the personality that should be used by the interface 24. As such, the adaptive interconnect logic 22 will use the control plane to negotiate a new datapath personality, and the process repeats as described above.

Based on the above, the adaptive interconnect logic 22 will effectively use a well-defined control path to negotiate the configuration for an interface 24 with the module's datapath. The datapath may be configured based on pin mapping, protocol conversion, signal levels, and the like. Any adaptive interconnect logic 22 may support different interface personalities for the various interfaces 24. Accordingly, various types of modules 26 supporting various communication technologies can be supported by any given access equipment 16 via the adaptive interconnect logic 22. Most importantly, the adaptive interconnect logic 22 will automatically configure itself to interact with the appropriate module 26. The following table outlines exemplary module types, however, these examples are not exhaustive.

| Module type examples (but not limited to these) | Typical interconnect options (but not limited to these) |
|---|---|
| Link interface module examples: | |
| n*E1/T1/T3 compression module | n*SMII 100 Mbps, m*Serdes, GMII, Utopia 2, vendor-specific |
| n*E1/T1/T3 circuit emulation module | n*SMII 100 Mbps, m*Serdes, GMII, Utopia 2, vendor-specific |
| n*VDSL module | n*SMII 100 Mbps, m*Serdes, GMII, Utopia 2, vendor-specific |
| n*SHDSL module | n*SMII 100 Mbps, m*Serdes, GMII, Utopia 2, vendor-specific |
| Precision timing module | n*SMII 100 Mbps, m*Serdes, GMII, Utopia 2, vendor-specific |
| Ethernet n*10/100/1000/10000 | n*SMII 100Mbps, m*Serdes, GMII, Utopia 2, vendor-specific optical/electrical module |
| Stack module | 622 Mbps TDM, m*Serdes, GMII, vendor-specific |
| Sonet n*OC-3/12/48/192 optical module | 622 Mbps TDM, m*Serdes, GMII, vendor-specific optical module |
| SDH STM-1/4/16/48 | 622 Mbps TDM, m*Serdes, GMII, vendor-specific |
| Server modules examples: | |
| CPU module | |
| NPU module | |
| DSP module | |

The access equipment 16 may be enterprise equipment owned and managed by an enterprise, metro customer located equipment owned and managed by a metropolitan service provider, metro points of presence, which can be outdoor plant or remote indoor plant boxes owned and managed by metropolitan service providers, enterprise access boxes that take multiple modules 26 through faceplate slots into a single motherboard, enterprise multi-card chassis boxes that have two or more motherboard cards, wherein each motherboard card can take multiple modules 26 through separate interconnects, or metro edge access boxes located at a customer's premise that can receive multiple modules 26 through a faceplate into one of two fault-tolerant motherboards.

In general, the adaptive interconnect logic 22 is the physical logic that connects a motherboard of the control system 18 to the modules 26. Each motherboard will have multiple interfaces 24, wherein the particular pins connecting the interfaces 24 with the modules 26 are typically grouped into power, datapath, and control pins 34, 36, 38. Notably, the adaptive interconnect logic 22 may be provided on the module 26 itself, but regardless of location will act as a universal translator between communication technologies using an appropriate datapath configuration.

Those skilled in the art will recognize improvements and modifications to the preferred embodiments of the present invention. All such improvements and modifications are considered within the scope of the concepts disclosed herein and the claims that follow. Also included as a part of this provisional application are two attachments: a document entitled Last Mile Access Application Impacts on Module Interconnect Definition, and a PowerPoint presentation, both of which are incorporated herein by reference in their entireties.

What is claimed is:

1. An adaptive interconnect for providing an interface between multiple modules and a control system comprising:
   a) a control system interface;
   b) a plurality of module interfaces; and
   c) adaptive interconnect logic associated with the control system interface and the plurality of module interfaces and adapted to:
      negotiate with a module over a control path via one of the plurality of module interfaces to identify an interface personality for the module;
      select the interface personality based on negotiations with the module;
      apply the interface personality to the one of the plurality of module interfaces, such that the applied interface personality provides an appropriate interconnection between the control system interface and the one of the plurality of module interfaces via a plurality of pins;
      receive a stimulus indicative of a change in personality for the module;
      renegotiate with the module over the control path via the one of the plurality of module interfaces to identify a new interface personality for the module;
      select the new interface personality based on the renegotiations with the module; and
      apply the new interface personality to the one of the plurality of module interfaces.

2. The adaptive interconnect of claim 1 wherein different interface personalities can be implemented simultaneously among the plurality of module interfaces.

3. The adaptive interconnect of claim 1 wherein the adaptive interconnect logic is further adapted to renegotiate with the module over the control path if initial negotiations fail.

4. The adaptive interconnect of claim 3 wherein if the renegotiation fails, the adaptive interconnect logic is further adapted to send a notification of failure.

5. The adaptive interconnect of claim 1 wherein negotiating, selecting and applying the interface personality are dynamic and occur automatically upon plugging the module into the one of the plurality of module interfaces.

6. A method for providing an interface between multiple modules and a control system comprising:
   negotiating with a module over a control path via one of a plurality of module interfaces to identify an interface personality for the module;
   selecting the interface personality based on negotiations with the module;
   applying the interface personality to the one of the plurality of module interfaces, such that the applied interface personality provides an appropriate interconnection between the control system and the one of the plurality of module interfaces via a plurality of pins;
   receiving a stimulus indicative of a change in personality for the module,
   renegotiating with the module over the control path via the one of the plurality of module interfaces to identify a new interface personality for the module,
   selecting the new interface personality based on the renegotiations with the module; and
   applying the new interface personality to the one of the plurality of module interfaces.

7. The method of claim 6 wherein different interface personalities can be implemented simultaneously among the plurality of module interfaces.

8. The method of claim 6 further comprising renegotiating with the module over the control path if initial negotiations fail.

9. The method of claim 8 wherein if the renegotiation fails, further comprising sending a notification of failure.

10. The method of claim 6 wherein negotiating, selecting and applying the interface personality are dynamic and occur automatically upon plugging the module into the one of the plurality of module interfaces.

11. The adaptive interconnect of claim 1 wherein the plurality of pins include power pins, control pins, and datapath pins.

12. The adaptive interconnect of claim 11 wherein the adaptive interconnect logic negotiates with the module using the control pins.

* * * * *